US012377426B2

(12) United States Patent
Lafosse et al.

(10) Patent No.: US 12,377,426 B2
(45) Date of Patent: Aug. 5, 2025

(54) FLUID PRODUCT DISPENSER

(71) Applicant: APTAR FRANCE SAS, Le Neubourg (FR)

(72) Inventors: Alain Lafosse, Franqueville Saint Pierre (FR); Yann Kanarek, Rosay sur Lieure (FR)

(73) Assignee: APTAR FRANCE SAS, Le Neubourg (FR)

( * ) Notice: Subject to any disclaimer, the term of this patent is extended or adjusted under 35 U.S.C. 154(b) by 461 days.

(21) Appl. No.: 17/921,816

(22) PCT Filed: Apr. 27, 2021

(86) PCT No.: PCT/FR2021/050723
§ 371 (c)(1),
(2) Date: Oct. 27, 2022

(87) PCT Pub. No.: WO2021/219953
PCT Pub. Date: Nov. 4, 2021

(65) Prior Publication Data

US 2023/0173517 A1 Jun. 8, 2023

(30) Foreign Application Priority Data

Apr. 28, 2020 (FR) ...................................... 2004216

(51) Int. Cl.
*B05B 11/10* (2023.01)

(52) U.S. Cl.
CPC ...... *B05B 11/1049* (2023.01); *B05B 11/1047* (2023.01)

(58) Field of Classification Search
CPC ............. B05B 11/1047; B05B 11/1049; B05B 11/001
See application file for complete search history.

(56) References Cited

U.S. PATENT DOCUMENTS 3,339,770 A * 9/1967 Weigand ................ B65D 41/06 215/214
6,138,873 A * 10/2000 Gramola ................ B65D 41/47 222/153.14

(Continued)

FOREIGN PATENT DOCUMENTS

FR 2 948 344 A1 1/2011
WO 2009/150351 A1 12/2009
WO 2010/067031 A1 6/2010

OTHER PUBLICATIONS

International Search Report for PCT/FR2021/050723 dated, Sep. 13, 2021 (PCT/ISA/210).

(Continued)

*Primary Examiner* — Paul R Durand
*Assistant Examiner* — Randall A Gruby
(74) *Attorney, Agent, or Firm* — Sughrue Mion, PLLC

(57) ABSTRACT

Fluid product dispenser comprising:
a reservoir (R) having a neck (1),
a dispensing head (T) mounted axially on the neck (1) and comprising a dispensing member (P), and a fastening ring (F) engaging both the neck (1) and the dispensing member (P), the fastening ring (F) comprising a skirt (2) including a plurality of internal latching projections (211),
characterised in that the neck (1) defines externally a plurality of horizontal latching shoulders (130) oriented downward and a plurality of release ramps (112), the latching projections (211), initially engaged below the horizontal latching shoulders (130), being constrained radially outward on the release ramps (112) by rotation of the skirt (2) around the neck (1), thus releasing the latching projections (211) of their latching engagement from below the latching shoulders (130).

14 Claims, 5 Drawing Sheets

(56) References Cited

U.S. PATENT DOCUMENTS

Figure 1:
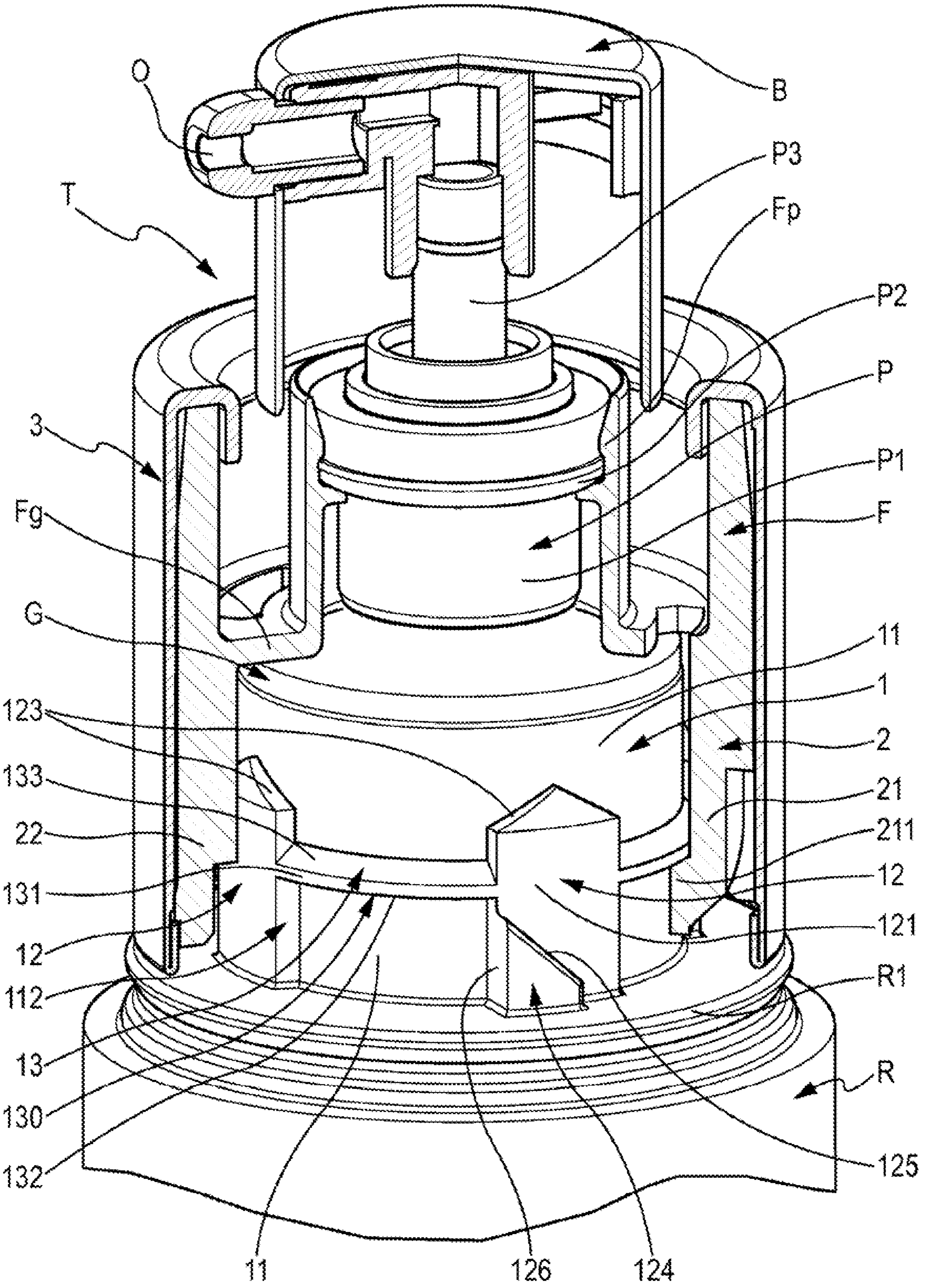

| | | | | | |
|---|---|---|---|---|---|
| 6,155,462 | A * | 12/2000 | Brecheisen | B05B 11/1011 215/276 |
| 10,722,911 | B2 * | 7/2020 | Surin | B05B 11/1047 |
| 11,014,107 | B2 * | 5/2021 | Alluigi | B05B 11/001 |
| 11,338,309 | B2 * | 5/2022 | Alluigi | B05B 11/001 |
| 11,471,903 | B2 * | 10/2022 | El Hassain | B05B 11/0038 |
| 12,201,997 | B2 * | 1/2025 | Lafosse | B05B 11/1047 |
| 2006/0283830 | A1 * | 12/2006 | Jourdin | B05B 11/1049 215/273 |
| 2011/0024465 | A1 * | 2/2011 | Roosel | B05B 11/1049 222/321.1 |
| 2012/0318825 | A1 * | 12/2012 | Beranger | B05B 11/1049 222/321.1 |

OTHER PUBLICATIONS

International Preliminary Report on Patentability (with translation of Written Opinion) dated Oct. 27, 2022, issued in International Application No. PCT/FR2021/050723.

* cited by examiner

FLUID PRODUCT DISPENSER

CROSS REFERENCE TO RELATED APPLICATIONS

This application is a National Stage of International Application No. PCT/FR2021/050723 filed Apr. 27, 2021, claiming priority based on French Patent Application No. 2004216 filed Apr. 28, 2020.

The present invention relates to a fluid product dispenser comprising a fluid product reservoir having a neck internally defining an opening upward and communicating with the inside of the reservoir and externally an external latching shoulder oriented downward. The dispenser also comprises a dispensing head mounted on the neck of the reservoir and comprising a dispensing member, such as a pump or a valve, and a fastening ring engaging both the neck of the reservoir and the dispensing member. The fastening ring comprises a skirt forming a plurality of internal latching projection capable of axially engaging below the latching shoulder of the neck.

Such dispensers are frequently used in the fields of perfumery, cosmetics, or also pharmacy.

In the prior art, document FR2948344 is known, which described a fastening system for removably fastening a dispensing member (pump or valve) on a reservoir neck. This system comprises:

- a fastening ring comprising flexible axial tabs capable of being latched around the reservoir neck, the tabs being separated by axial slots,
- a locking sleeve engaged around the fastening ring so as to block the tabs engaged around the neck.

The sleeve forms a plurality of locking sectors, intended to engage with the tabs to block them around the neck and a plurality of unlocking sectors not in contact with the ring. The sleeve is displaceable in rotation around the ring between a mounting position, in which the locking sectors are engaged with the tabs, and a dismounting position, in which the locking sectors are located at the slots to allow the tabs to be deformed to be released from their engagement with the neck.

This fastening system of the prior art has a plurality of disadvantages, and in particular:

- the sleeve must be able to rotate around the ring, which implies that the ring must be blocked in rotation on the neck,
- the gesture is not intuitive, as it involves first rotating the sleeve over a precise angle, then pulling on the sleeve to forcefully release the flexible tabs of the fastening ring from below the neck. Without any written operating instructions, it is not possible to remove a dispensing head from the neck with this fastening system.

In the prior art, document WO 2009/150351 is known, which describes a dispenser comprising a vessel provided with a threaded neck and a fastening ring comprising a deformable and malleable skirt intended to engage with the threaded neck, and a rigid band engaged around the skirt to push the skirt radially against the threaded neck in such a way as to deform the skirt against the thread of the neck so as to create a thread imprint in the skirt. The skirt of the fastening ring is thus brought into engagement with the threaded neck by an inwardly-directed radial movement, and not by an axial turning movement, as with conventional threaded skirts. Before the skirt is mounted for the first time on a threaded neck, the skirt does not include any thread imprint: it is only while radial thrust is being applied by means of the band, that the thread imprint is created by plastic deformation of the deformable and malleable skirt. The material constituting the deformable and malleable skirt creeps plastically around the threads of the neck of the vessel in order to achieve a final state with a satisfactory thread imprint.

This dispenser of the prior art thus allows to mount the skirt around the neck without rotation and then allows to remove the skirt from the neck by simple unscrewing. This dispenser therefore meets a recycling requirement by allowing the separation of these constituent elements. However, it has been found empirically that it is not possible to rescrew the skirt onto the neck for several reasons. The first is that the contact between the skirt and the neck is extremely close and tight, such that there is absolutely no clearance. The second results from the skirt relaxes slightly when it is removed from the neck as a result of its malleability. The third reason is associated with the fact that the skirt is formed of flexible tabs that are separated by slots: when it is desired to rescrew the skirt, its tabs hook the thread of the neck and come across, thus making it impossible to rescrew. It is therefore not possible to reuse this dispenser, which does not meet the current requirement of durability.

The present invention aims to propose another type of removable fastening, the mounting of which is performed also by pure axial thrust, but which implements a snap-fitting or gripping without permanent deformation/material creeping and without the use of a band or of a blocking sleeve. The release of the ring (skirt) must be performed simply by a natural and intuitive motion of rotation of the ring (skirt) around the neck, but without the use of a thread.

To do this, the present invention proposes a fluid product dispenser comprising:

- a fluid product reservoir having a neck internally defining an opening oriented upward;
  - a dispensing head mounted on the neck of the reservoir, the head comprising: a dispensing member, such as a pump or a valve; a pusher for actuating the dispensing member, and a fastening ring engaging both the neck of the reservoir and the dispensing member, the fastening ring comprising a skirt including a plurality of internal latching projections,
- characterised in that the neck defines externally a plurality of horizontal latching shoulders oriented downward and a plurality of release ramps, the latching projections, initially engaged below the horizontal latching shoulders, being constrained radially outward on the release ramps by rotation of the skirt around the neck, thus releasing the latching projections from their latching engagement below the latching shoulders.

Contrary to documents FR2948344 and WO2009/150351, the rotation of the skirt allows to disengage the latching projections from below the latching shoulders by urging them radially outward by means of ramps, which are distinct from the latching shoulders. The latching of the projections under the shoulders is fully ensured by the skirt, without the use of a blocking band or sleeve. The ramps are qualified to as "vertical" because the flat surfaces they define fall within vertical planes. In other words, their largest slope is horizontal.

Advantageously, each release ramp connects two neck zones which are radially offset and located axially at the same level, namely a base zone located axially below each horizontal latching shoulder and a projecting zone located between two adjacent horizontal latching shoulders. The release ramp allows to go from the base zone to the projecting zone with a pure rotation movement (without axial component) of the skirt around the neck.

Preferably, at least one of the projecting zones has an oblique unscrewing cam against which an edge of one of the internal latching projections is urged axially upward, during the rotation of the skirt around the neck. This oblique unscrewing cam itself projects radially outward with respect to the projecting zone.

According to an aspect of the invention, the latching shoulders each define a substantially sharp latching ridge, which extends advantageously substantially in radial alignment with the projecting zone, so as to form a continuous annular line. In other words, the external periphery of the latching ridges is substantially or fully contiguous and continuous with the projecting zones.

Moreover, the neck can externally form a plurality of oblique cams of angular indexing, on which edges of the internal latching projections are urged in rotation during the axial displacement of the skirt towards the neck, so as to automatically bring the internal latching projections in axial alignment with their respective latching shoulders, before their latching under the latching shoulders. These oblique cams of angular indexing allow to avoid an angular orientation operation of the skirt with respect to the neck. The simple action of axially depositing the skirt through gravity on the neck leads to a rotation of the skirt, the latching projections of which come in alignment with their respective shoulders.

According to another advantageous characteristic of the invention, the neck forms a horizontal radial expansion ramp located axially above each latching shoulder, the internal latching projections being elastically deformed radially outward on the radial expansion ramps, to then relax under their respective latching shoulders. The radial expansion ramps are oriented substantially or fully perpendicular to the release ramps. Thus, once the skirt has been correctly oriented with respect to the neck by the oblique cams of angular indexing, the latching projections come into contact with the radial expansion ramps. It is then necessary to exert an axial thrust to constrain the latching projections to pass by force on the radial expansion ramps before being able to engage or snap under the latching shoulders.

According to an advantageous embodiment, the skirt forms a plurality of latching tabs each forming an internal latching projection. The latching tabs are relatively deformable to be able to pass over the radial expansion ramps, but must be sufficiently rigid to return with force under the latching shoulders and remain in engagement without the use of a band or of a blocking sleeve. The thickness of the tabs will consequently be defined.

Advantageously, the skirt also forms a plurality of axial holding tabs defining internal faces which come into close and extended contact with extended projecting zones of the neck, the axial holding tabs and the latching tabs being alternately disposed, the latching projections extending radially further inward than the internal faces of the axial holding tabs.

Preferably, the axial holding tabs define external contact faces and the latching tabs define free external faces, the external contact faces extending radially further outward than the free external faces, thus allowing the latching tabs to be radially deformed outward by remaining in the bulkiness defined by the axial holding tabs. The skirt thus has a serrated configuration with different separate tabs disposed alternatively radially staggered.

Although the latching projections themselves solely ensure the holding on the neck, the dispenser can, all the same, comprise a trim band which is in contact with the external contact faces of the axial holding tabs. This band will be, in most cases, purely aesthetic.

Optionally, the internal faces of the axial holding tabs can each form a lower gap housing the oblique unscrewing cam of the neck.

According to an advantageous detailed embodiment:

- the neck externally defines a cylindrical base zone and a plurality of projecting supports, separated from one another by the cylindrical base zone, except at the projecting ribs, each projecting support forming a projecting zone, a vertical release ramp and advantageously at least a oblique cam of angular indexing, which connects the cylindrical base zone to the extended radially zone and advantageously, an oblique unscrewing cam, which projects from the projecting zone, each projecting rib forming a latching shoulder and a radial expansion ramp,
- the skirt comprises a base cylindrical external face, the skirt comprising latching tabs which form the latching projections coming in direct proximity to or in contact with the base cylindrical zone of the neck below the latching shoulders, the skirt also comprising axial holding tabs coming into close and extended contact with the extended projecting zones of the neck, the latching tabs and the axial holding tabs being arranged alternately, being separated by vertical slots, the latching tabs defining free external faces which are offset radially inward with respect to the base cylindrical external face, while the axial holding tabs define external contact faces which are aligned and continuous with the base cylindrical external face, the axial holding tabs advantageously each forming a lower gap housing the unscrewing cam of the neck, and
- a trim band engaging the contact external faces of the axial holding tabs.

The spirit of the present invention resides in the fact that the neck of the reservoir has both latching means by snap-fitting or gripping and release means by radial displacement, these two means being separate and distinct: on one side, horizontal latching shoulders, and on the other side, vertical release ramps by radial expansion.

The invention will now be more fully described in reference to the accompanying drawings, giving as a non-limiting example, an embodiment of the invention.

Figure 2:
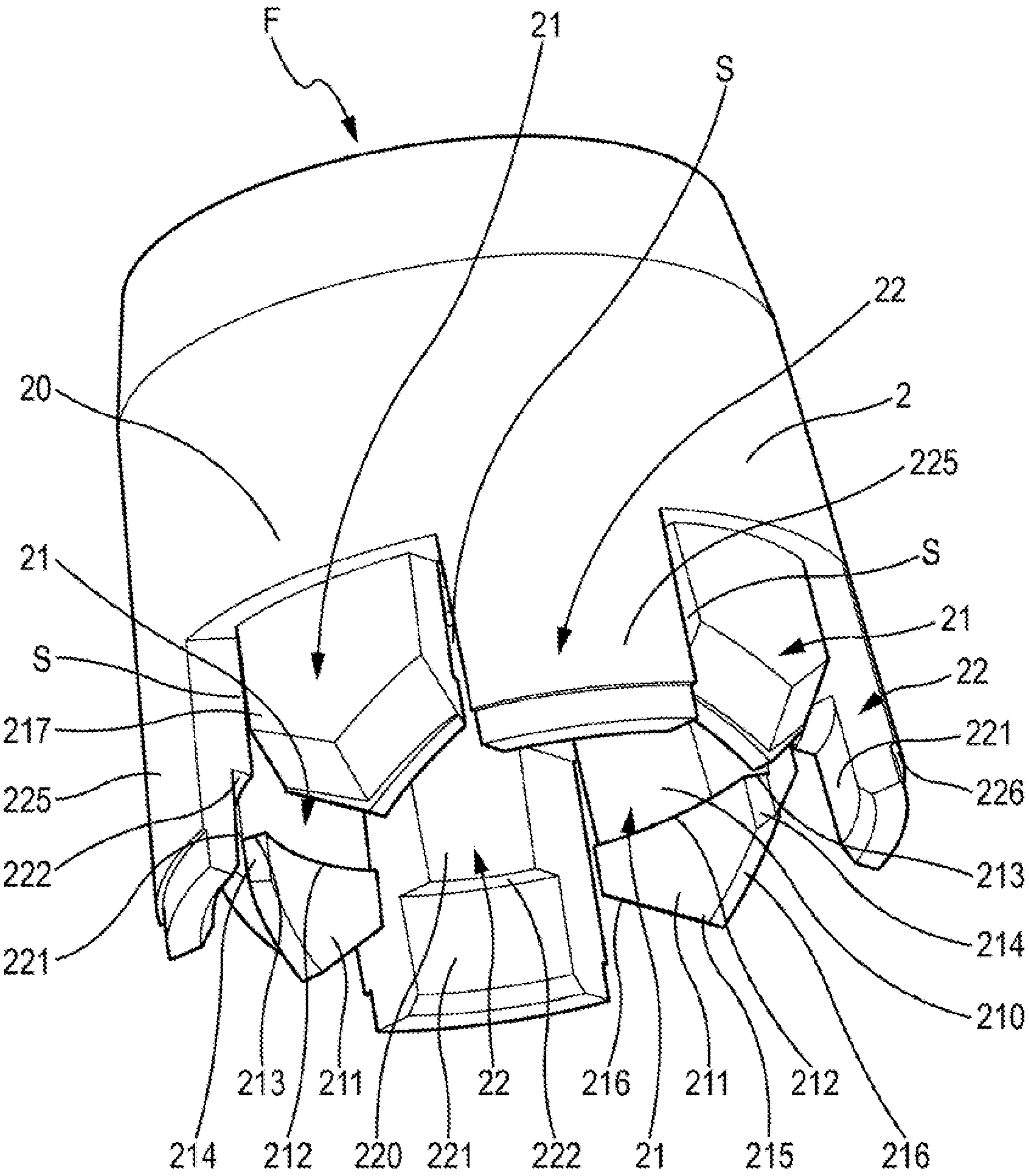
Figure 3:
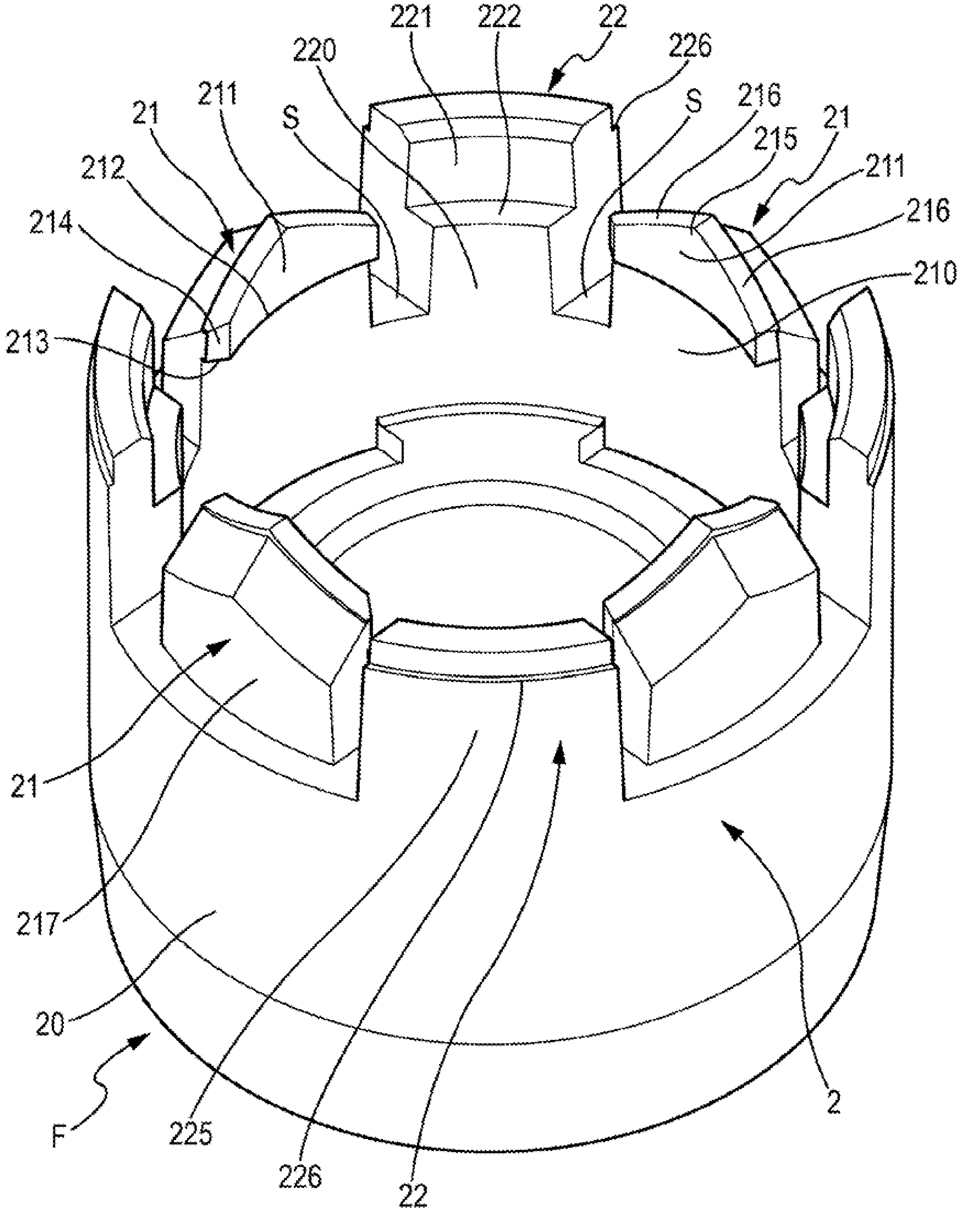
Figure 4:
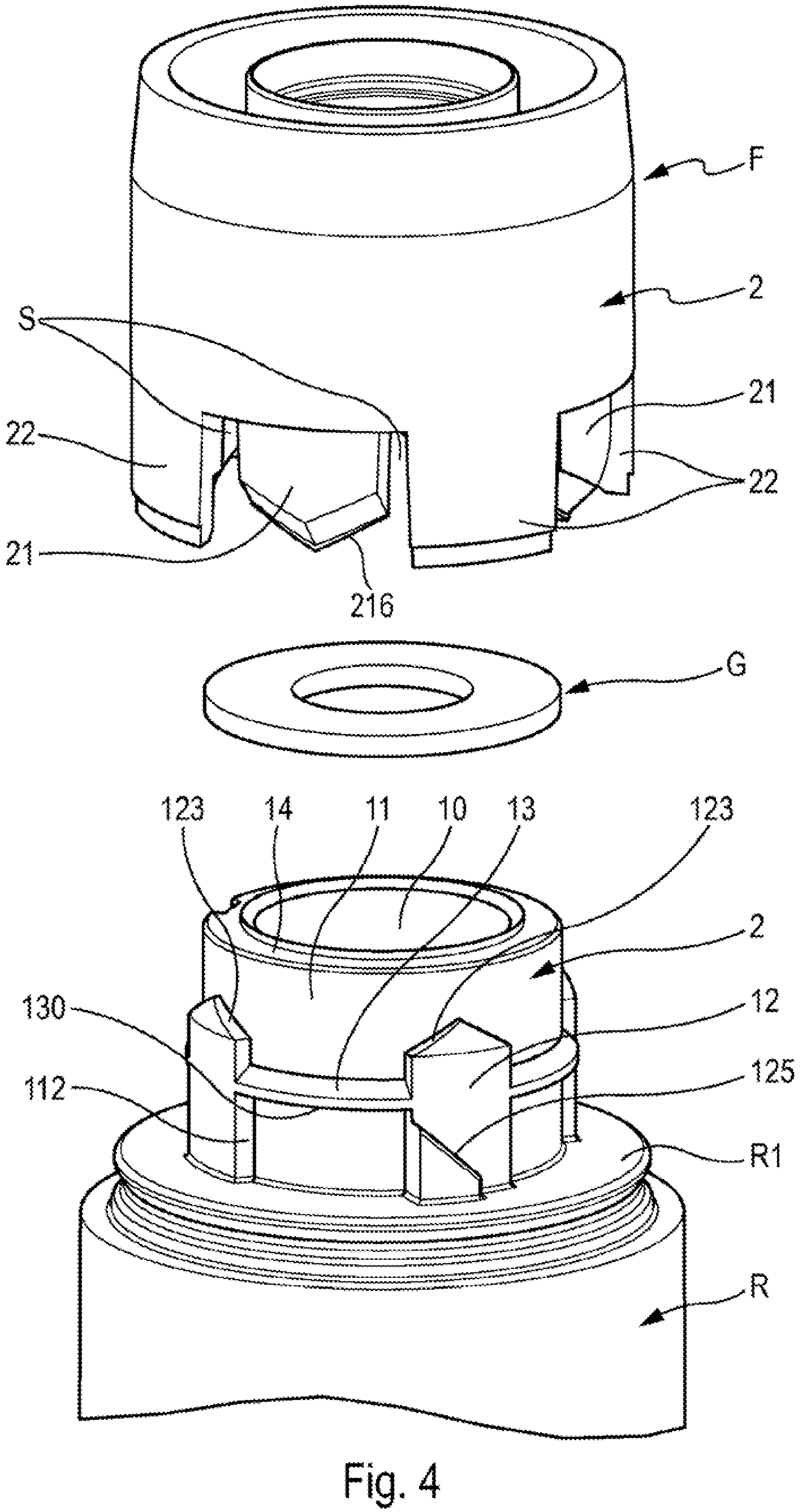
Figure 5:
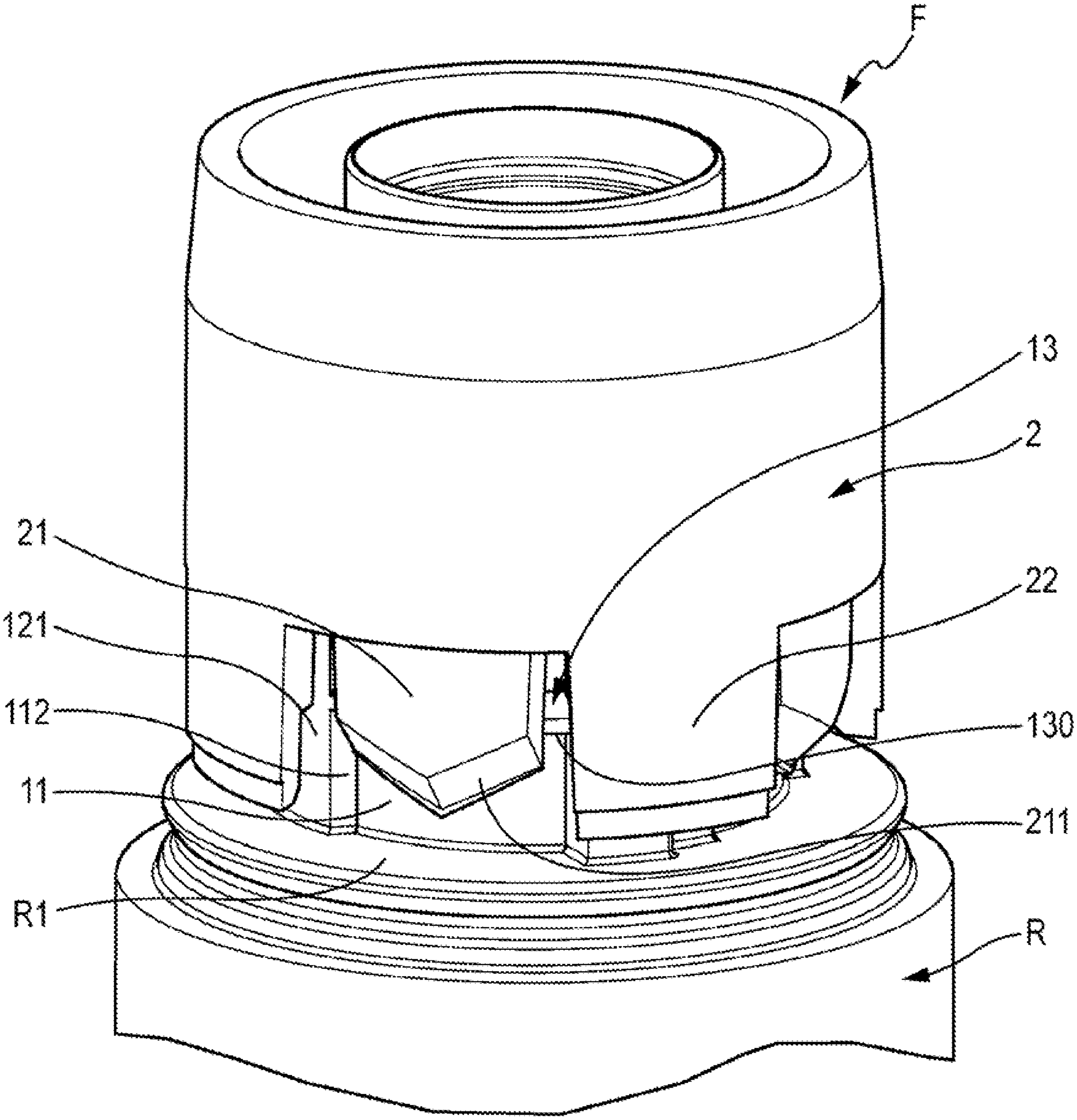

In the figures:

FIG. 1 is a perspective, partially cross-sectional view of a dispenser according to the invention, showing the design of a reservoir according to the invention, FIGS. 2 and 3 are enlarged views along different angles of the fastening ring of the invention cooperating with the neck of FIG. 1, FIG. 4 is a perspective, exploded view from of the neck and of the fastening ring F, with an interposed neck joint, and FIG. 5 is a perspective view in the mounted state of the neck and of the fastening ring of FIG. 4, The fluid product dispenser represented in FIG. 1 to illustrate the present invention comprises two distinct parts or subassemblies, namely a fluid product reservoir R and a dispensing head T intended to be mounted on the reservoir to together constitute the dispenser.

The fluid product reservoir R is only partially represented in the figures. Only the neck 1 and a part of the plate R1 of the reservoir R have been represented in the figures. The neck 1 projects axially upward from the plate R1 which already forms a part of the body of the reservoir. The neck 1 internally defines an opening 10 which is oriented upward and which makes the inside of the reservoir communicate with the outside. The opening 10 is defined by an annular top edge 14 of the neck 11.

Externally, the neck 1 defines a plurality of projecting supports 13 separated from one another by a cylindrical base zone 11, which extends between the projecting supports 13, and also above the supports 13 to the annular upper edge of the neck 1. The projecting supports 13 are however connected together by projecting ribs 12, which extend horizontally. Each projecting support 13 forms a projecting zone 121, preferably cylindrical, which extends radially further outward than the cylindrical base zone 11: in other words, the projecting supports 13 project with respect to the cylindrical base zone 11.

Each projecting support 13 forms a vertical release ramp 12 below its projecting rib 12 located to the right of the support in FIG. 1. The vertical release ramp 112 connects the cylindrical base zone 11 to the projecting zone 121. The vertical release ramp 112 defines two joining ridges, respectively with the cylindrical base zone 11 and the projecting zone 121, which extend vertically. The strongest slope of the vertical release ramp 112 extends horizontally. In the axial or vertical direction, the vertical release ramp 112 connects the plate S to the projecting rib 12.

Each projecting support 13 also forms two oblique cams of angular indexing 123, connecting the cylindrical base zone 11 to the radially extended zone 121. Visually, the two oblique cams of angular indexing 123 form a sort of two-panel roof for the projecting support 13. The two oblique cams of angular indexing 123 have slopes, opposite and joining one another at their top ends by forming a peak, which also forms the upper tip of the projecting support. The bottom ends of the two oblique cams of angular indexing 123 are respectively located axially in vertical alignment with the two projecting ribs 12 adjacent to the projecting support 13. In a variant, instead of the two oblique cams of angular indexing 123, only one of them could be provided. It would also be possible to do without oblique cams of angular indexing 123: the angular indexing should thus be done by other means.

Each projecting support 13 can also have a small triangular block 124 which projects from the projecting zone 121. This small triangular block 124 forms an oblique unscrewing cam 125, which extends from the plate S upward in the levogyral direction to a vertical radial wall 126, which is contiguous to the cylindrical base zone 11.

Each projecting rib 13 comprises a horizontal latching shoulder 130 which is oriented outward and downward. This horizontal latching shoulder 130 is here formed by a cylindrical vertical wall 131 and a lower horizontal flat wall (non-visible), which both extend from a projecting support to the other adjacent. These two walls can be perpendicular and join together at a latching ridge 132, which is preferably sharp. The lower horizontal flat wall (non-visible) extends radially from the cylindrical base zone 11 to this latching ridge 132. It can be noted that the vertical release ramp 112 extends axially below the lower horizontal flat wall (non-visible). The cylindrical vertical wall 131 extends at the same radial level as the projecting zone 121, such that a continuous annular line is formed around the skirt at this level.

Each projecting rib 13 also comprises a horizontal radial expansion ramp 133, located just above the cylindrical vertical wall 131 and which connects the cylindrical base zone 11 to the cylindrical vertical wall 131. The strongest slope of this ramp 133 is vertical.

The reservoir R, with a neck 1 thus profiled is preferably made of a rigid plastic material. Being made of glass or metal cannot however be excluded.

The dispensing head T mainly comprises two constitutive members, namely a dispensing member P, which can be a pump or a valve, and a fastening ring F engaging both the profiled neck 1 of the reservoir and the dispensing member P. A pushbutton B can be mounted on the dispensing member P to actuate it. A dispensing member can also be imagined without pushbutton, for example in the form of an applicator, a stopper or a pot cover.

The dispensing member P comprises a body P1 defining at one of its ends, an inlet for the fluid product coming from the reservoir. The body P1 forms a fastening collar P2 which projects radially outward. The dispensing member P also comprises an actuation rod P3 which projects outside of the body P1 upward and which is displaceable axially back-and-forth with respect to the body. A counter spring urges the actuation rod P3 in its most extended position outside of the body. The actuation rod P3 internally defines a backflow channel for the pressurised fluid product inside the body P1. This design is entirely conventional for a pump or a valve in the fields of perfumery, cosmetics, and even pharmacy. Given that the internal structure of the dispensing member P is not critical for the present invention, it will not be further described.

The pushbutton B is mounted on the free end of the actuation rod P3 of the dispensing member P. The fluid product coming from the actuation rod P3 is driven through an internal channel to a dispensing hole O formed by the pushbutton. On the other hand, the pushbutton comprises a bearing surface on which the user can press using one or a plurality of fingers to displace the pushbutton B axially back-and-forth. In this manner, fluid product, in dosed form or not, is dispensed through the dispensing hole O. Again, this is an absolutely conventional design for a fluid product dispenser.

The fastening ring F is advantageously made of a slightly deformable plastic material, allowing to create relatively deformable zones, while other zones are more rigid. The fastening ring F is preferably made of one piece.

The fastening ring F includes a skirt 2 intended to engage around the profiled neck 1 of the reservoir. The skirt 2 consequently extends around the neck 1 to below the projecting ribs 13 and around projecting supports 12 in the mounted position, as represented in FIG. 1: the skirt 2 can come to the direct proximity or in contact with the plate S. The skirt 2 defines a base cylindrical external face 20.

The skirt forms latching tabs 21: the number of tabs 21 can vary from two to more than ten. In the figures, the skirt 2 forms six latching tabs 22. As can be seen in FIGS. 2 and 3, each latching tab 22 forms an internal latching projection 211, which projects radially inward with respect to an internal base face 210 of the tab. More precisely, the internal latching projection 211 forms a horizontal step 213 oriented upwards that connects the internal base face 210. This step 213 defines an internal ridge 212 oriented inward and upward. This ridge 212 is preferably sharp. The internal latching projection 211 also defines two vertical lateral edges 214, as well as a tip-shaped free end 215, with two opposite inclined flaps 216.

The skirt 2 also forms axial holding tabs 22 which substantially have the same length or height as the latching tabs 21. There are as many axial holding tabs 22 as there are latching tabs 21. The latching tabs 21 and the axial holding tabs 22 are disposed alternately by being separated by vertical slots S. Each axial holding tab 22 defines an internal contact face 220 and an external contact face 227. The internal face 220 is formed with a lower gap 221, where the wall thickness is reduced. This lower gap 221 extends over substantially the lower half of the tab 22. The external contact face 227 is also formed with a lower recess, which defines a fixing ridge 226.

The latching tabs 21 define free external faces 217 which are radially offset inward with respect to the base cylindrical external face 20 of the skirt 2, while the axial holding tabs 22 define external contact faces 227 which are aligned and continuous with the base cylindrical external face 20.

The fastening ring F also forms a receiving housing Fp for the fastening collar P2 and an annular flange Fg which serves to flatten a neck joint G on the upper edge 14 of the neck 1.

Advantageously, a band 3 is engaged around the fastening ring F in such a manner as to mask all or part of it. The aim of the band 3 is purely aesthetic in relation to the fastening ring F.

The manner in which the fastening ring F, and more specifically its skirt 2, cooperates with the profiled neck 1 during a mounting operation will now be described.

The dispensing head T is brought onto the neck 1 without prior angular orientation: it is quite simply deposited by gravity on the neck 1. It is unlikely that the latching tabs are angularly aligned with the latching shoulders 130 of the neck 1. Most of the time, the flaps 216 of the latching tabs 21 will come into contact with the oblique cams of angular indexing 123 of the projecting supports 13. The flaps 216 will thus slide over the cams 123, inducing a rotation of the dispensing head with respect to the reservoir R. The continuous rotation until the latching tabs 21 fall between two projecting supports: they are thus fully aligned with the latching shoulders 130 of the neck. The pointed free ends 215 of the latching projections 211 of the latching tabs 21 thus rest on the radial expansion horizontal ramps 133. Moreover, the axial holding tabs 22 start to engage around the projecting supports 12. This intermediate mounting position is reached without exerting any constraint on the dispensing head: only gravity has acted.

An axial thrust on the dispensing head T allows to constrain the latching projections 211 on the radial expansion horizontal ramps 133, which has the effect of elastically deforming the latching tabs 21 radially outward, until they pass over the cylindrical vertical walls 131, beyond which they can be elastically relaxed under the latching ridge 132. The final mounting position is thus reached. The axial tensile strength is only ensured by the snap-fitting or gripping of the latching projections 211 under the latching shoulders 130.

In this final mounting position, the internal contact faces 220 of the axial holding tabs 22 are in close and extended contact with the extended contact zone 121 of the projecting supports 12. The projecting blocks 124 are received in the lower gaps 221. The band 3 comes into close and extended contact with the external face 227 of the axial holding tabs 22, as well as with the base face 20 of the skirt 2. This contributes to stabilize the skirt 2 around the neck 1 with extended and close contacts.

It must be noted that the band 3 can be engaged around the skirt before the mounting of the head T on the neck, given that the latching tabs 21 can be deformed radially outward, since they are positioned in an offset manner inward, thus leaving a radial articulation space between the latching tabs 21 and the band 3.

The manner in which the fastening ring F, and more specifically its skirt 2, cooperates with the profiled neck 1 during a dismounting operation from the final mounting position will now be described.

While the reservoir is fixedly held, a sufficient torque exerted on the band 3 will rotate the fastening ring F with respect to the neck 1. This relative rotation has the effect of constraining the lateral edges 214 of the latching tabs 21 on the release vertical ramps 112 of the neck. It must be noted that the unscrewing direction is imposed by the vertical radial wall 126, which forms an abutment. The latching tabs 21 will be elastically deformed radially outward, until they reach the extended projecting zones 121. From this moment, the latching projections 211 are released from below the latching shoulders 130 and the dispensing head can be separated from the neck by axial traction. According to the invention, continuing the relative rotation has the effect of engaging a flap 216 of the pointed lower ends 215 of the latching projections 211 on the oblique unscrewing cams 125 of the blocks 124 of the projecting supports 12. This induces an axial displacement of the dispensing head T, in the manner of a conventional unscrewing. The dispensing head T can then be easily removed from the neck 1.

It must be noted that the dispensing head T can easily be remounted on the neck 1, after dismounting, by a user without any difficulty, as the remounting operation is identical to that of mounting.

From an operational standpoint, the projecting ribs 13 serve to:

Latch, snap-fit or grip the skirt 2 with their latching shoulders 130, and Elastically deform the latching tabs 21 radially outward with their horizontal radial expansion ramps 133.

The protruding supports 12 serve to:

Release the latching tabs 21 from below the latching shoulders 130 with their horizontal radial release ramps 112, Impose the angular orientation of the skirt 2 with respect to the neck 1 with the oblique cams of angular indexing 123, and Induce unscrewing movement after release with the oblique unscrewing cams 124.

The three latching functions, of radial elastic deformation and of release are essential, while the other angular orientation and final unscrewing functions are advantageous, but optional.

The invention claimed is:

1. A fluid product dispenser comprising:

a fluid product reservoir having a neck (1) internally defining an axial opening (10) oriented upward and communicating with the inside of the reservoir (R), a dispensing head (T) mounted axially on the neck (1) of the reservoir (R), the head (T) comprising a dispensing member (P) and a fastening ring (F) engaging both the neck (1) of the reservoir (R) and the dispensing member (P), the fastening ring (F) comprising a skirt (2) including a plurality of internal latching projections (211), wherein the neck (1) defines externally a plurality of horizontal latching shoulders (130) oriented downward and a plurality of release ramps (112), the latching projections (211), initially engaged below the horizontal latching shoulders (130), being constrained radially outward on the release ramps (112) by rotation of the skirt (2) around the neck (1), thus releasing the latching projections (211) of their latching engagement from below the latching shoulders (130);

wherein the skirt forms a plurality of latching tabs, each forming one of the plurality of the internal latching projections; and wherein the skirt forms a plurality of axial holding tabs defining internal faces which come into close and extended contact with projecting zones of the neck, wherein each projecting zone is located between two adjacent horizontal latching shoulders, the axial holding tabs and the latching tabs being disposed alternately, the latching projections extending radially further inward than the internal faces of the axial holding tabs.

2. The dispenser according to claim 1, wherein each release ramp (112) connects two neck zones which are radially offset and located axially at the same level, namely a base zone (11) located axially below each horizontal latching shoulder (130) and a projecting zone (121) located between two adjacent horizontal latching shoulders (130).

3. The dispenser according to claim 2, wherein at least one of the projecting zones (121) is provided with an oblique unscrewing cam (125) against which a lateral edge (214) of one of the internal latching projections (211) is urged axially upward, during the rotation of the skirt (51) around the neck (1).

4. The dispenser according to claim 2, wherein the latching shoulders (130) each define a substantially sharp latching ridge (132), which extends advantageously in radial alignment with the projecting zone (121), so as to form a continuous annular line.

5. The dispenser according to claim 1, wherein the neck (1) externally forms a plurality of oblique cams of angular indexing (123) on which lateral edges (214) of the internal latching projections (211) are urged in rotation during the axial displacement of the skirt (2) towards the neck (1), so as to automatically bring the internal latching projections (211) in axial alignment with their respective latching shoulders (130), before their latching under the latching shoulders (130).

6. The dispenser according to claim 1, wherein the neck (1) forms a radial expansion ramp (133) located axially above each latching shoulder (130), the internal latching projections (211) being elastically deformed radially outward on the radial expansion ramps (133), to then be relaxed under their respective latching shoulders (130).

7. The dispenser according to claim 1, wherein the axial holding tabs (22) define external contact faces (227) and the latching tabs (21) define free external faces (217), the external contact faces (227) extending radially further outward than the free external faces (217), thus allowing the latching tabs (21) to be deformed radially outward by remaining in bulkiness defined by the axial holding tabs (22).

8. The dispenser according to claim 1, further comprising a trim band (3) which is in contact with the external contact faces (227) of the axial holding tabs (22).

9. The dispenser according to claim 1, wherein the internal faces (220) of the axial holding tabs (22) each form a lower gap (221) housing an unscrewing cam (125) of the neck (1).

10. The dispenser according to claim 1, wherein the dispensing member is a pump or a valve.

11. A fluid product dispenser comprising:

a fluid product reservoir having a neck (1) internally defining an axial opening (10) oriented upward and communicating with the inside of the reservoir (R), a dispensing head (T) mounted axially on the neck (1) of the reservoir (R), the head (T) comprising a dispensing member (P) and a fastening ring (F) engaging both the neck (1) of the reservoir (R) and the dispensing member (P), the fastening ring (F) comprising a skirt (2) including a plurality of internal latching projections (211), wherein the neck (1) defines externally a plurality of horizontal latching shoulders (130) oriented downward and a plurality of release ramps (112), the latching projections (211), initially engaged below the horizontal latching shoulders (130), being constrained radially outward on the release ramps (112) by rotation of the skirt (2) around the neck (1), thus releasing the latching projections (211) of their latching engagement from below the latching shoulders;

wherein the skirt (2) forms a plurality of axial holding tabs (22) defining internal faces (220) which come into close and extended contact with projecting zones (121) of the neck (1); and wherein the internal faces (220) of the axial holding tabs (22) each form a lower gap (221) housing an unscrewing cam (125) of the neck (1).

12. The dispenser according to claim 11, wherein the dispensing member is a pump or a valve.

13. A fluid product dispenser comprising:

a fluid product reservoir having a neck (1) internally defining an axial opening (10) oriented upward and communicating with the inside of the reservoir (R), a dispensing head (T) mounted axially on the neck (1) of the reservoir (R), the head (T) comprising a dispensing member (P) and a fastening ring (F) engaging both the neck (1) of the reservoir (R) and the dispensing member (P), the fastening ring (F) comprising a skirt (2) including a plurality of internal latching projections (211), wherein the neck (1) defines externally a plurality of horizontal latching shoulders (130) oriented downward and a plurality of release ramps (112), the latching projections (211), initially engaged below the horizontal latching shoulders (130), being constrained radially outward on the release ramps (112) by rotation of the skirt (2) around the neck (1), thus releasing the latching projections (211) of their latching engagement from below the latching shoulders;

wherein the neck (1) externally defines a cylindrical base zone (11) and a plurality of projecting supports (12) separated from one another by the cylindrical base zone (11), except at projecting ribs (13), each projecting support (12) forming a projecting zone (121), a vertical release ramp (112) and advantageously at least one oblique cam of angular indexing (123) which connects the cylindrical base zone (11) to the projecting zone (121) and advantageously an oblique unscrewing cam (125) which projects from the projecting zone (121), each projecting rib (13) forming one of the plurality of the horizontal latching shoulders (130) and a radial expansion ramp (133), and wherein the skirt (2) comprises a base cylindrical external face (20), the skirt (2) comprising latching tabs (21) which form the latching projections (211) coming below the latching shoulders (130), each internal latching projection (211) defining two vertical lateral edges (214), as well as a tip-shaped free end (215), the skirt (2) also comprising axial holding tabs (22) coming into close and extended contact with the projecting zones (121) of the neck (1), the latching tabs (21) and the axial holding tabs (22) being disposed alternately by being separated by vertical slots(S), the latching tabs (21) defining free external faces (217) which are offset radially inward with respect to the base cylindrical external face (20), while the axial holding tabs (22) define external contact faces (227) which are aligned and continuous with the base cylindrical external face (20), the axial holding tabs (22) each advantageously forming a lower gap (221) housing the unscrewing cam (125) of the neck (1), and a trim band (3) engaging the external contact faces (227) of the axial holding tabs (22).

14. The dispenser according to claim 13, wherein the dispensing member is a pump or a valve.

* * * * *